(12) United States Patent
Maeda et al.

(10) Patent No.: US 6,522,322 B1
(45) Date of Patent: Feb. 18, 2003

(54) TOUCH PANEL INPUT DEVICE

(75) Inventors: Toshifumi Maeda, Toyama-Ken (JP); Hiroshi Tanaka, Toyama-Ken (JP); Hidemasa Sakurada, Toyama-Ken (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 09/417,567

(22) Filed: Oct. 14, 1999

(30) Foreign Application Priority Data

Mar. 30, 1999 (JP) ............................................. 11-088371

(51) Int. Cl.[7] ................................................. G09G 5/00
(52) U.S. Cl. ..................... 345/173; 345/174; 178/18.05; 341/34
(58) Field of Search .................................. 345/173, 174, 345/156, 157, 179; 428/337; 178/18.01–18.11, 19.01–19.07; 341/22, 34, 32, 33

(56) References Cited

U.S. PATENT DOCUMENTS 4,958,148 A * 9/1990 Olson ...................... 178/18.01
4,990,900 A * 2/1991 Kikuchi ...................... 200/5 A
5,871,843 A * 2/1999 Yomeda et al. ............. 428/337

* cited by examiner

*Primary Examiner*—Dennis-Doon Chow
(74) *Attorney, Agent, or Firm*—Darby & Darby (57) ABSTRACT

A transparent insulative liquid is sealed between two transparent plates that are coated with transparent conductor layers on their mutually facing surfaces of a touch panel input device. The facing surface of at least one of the transparent plates is roughened. Because the conductor layer is applied directly over the roughened surface of the transparent plate, the conductor layer is also roughened. When the entire device is tilted, the insulative liquid settles downward allowing the upper conductor layers to come into contact with each other, but because the surface is roughened only the protrusions of the conductor layer make contact. The overall contact resistance does not decrease sufficiently to be interpreted as a pressing operation. When a pressing operation is made, the insulative liquid flows into the depressions created by the roughened surface of the conductor layer. Because the liquid is not interposed between conductor layers, sure contact is made, and the pressed position requires only a light pressing force.

13 Claims, 6 Drawing Sheets

TOUCH PANEL INPUT DEVICE

BACKGROUND OF THE INVENTION

The present invention relates to a touch panel input device. Command input data is entered by pressing the surface of a transparent plate with a pen, finger, or the like. An electrical impulse is generated corresponding to the position of the pressure point and is sent to a processing device. More specifically, the present invention relates to a touch panel input device that enhances visibility by sealing a transparent insulative liquid between transparent plates. In general, touch panel input devices are found on the display screens of liquid crystal panels, CRTs, or the like. The operational surface of the touch panel input device is pressed while viewing the display information. The pressed position is detected and interpreted as command input data corresponding to the displayed content. The command input data is then sent to a processing device.

Touch panel input devices generally consist of a movable plate laminated over a substrate plate with an intervening insulative gap. Both the movable plate and the substrate plate have conductive layers covering their surfaces. The conductive surfaces are arraigned to face each other. The conductive surfaces are made from a transparent material which allows the underlying display screen to be viewed through them. There is a large difference between the refractive index of the air in the insulative gap and the refractive indices of the substrate and the movable plate. The difference in the refractive indices results in a transmittivity of only about 80% The reduction of the transmitted light makes the underlying display screen difficult to view.

Figure 5:
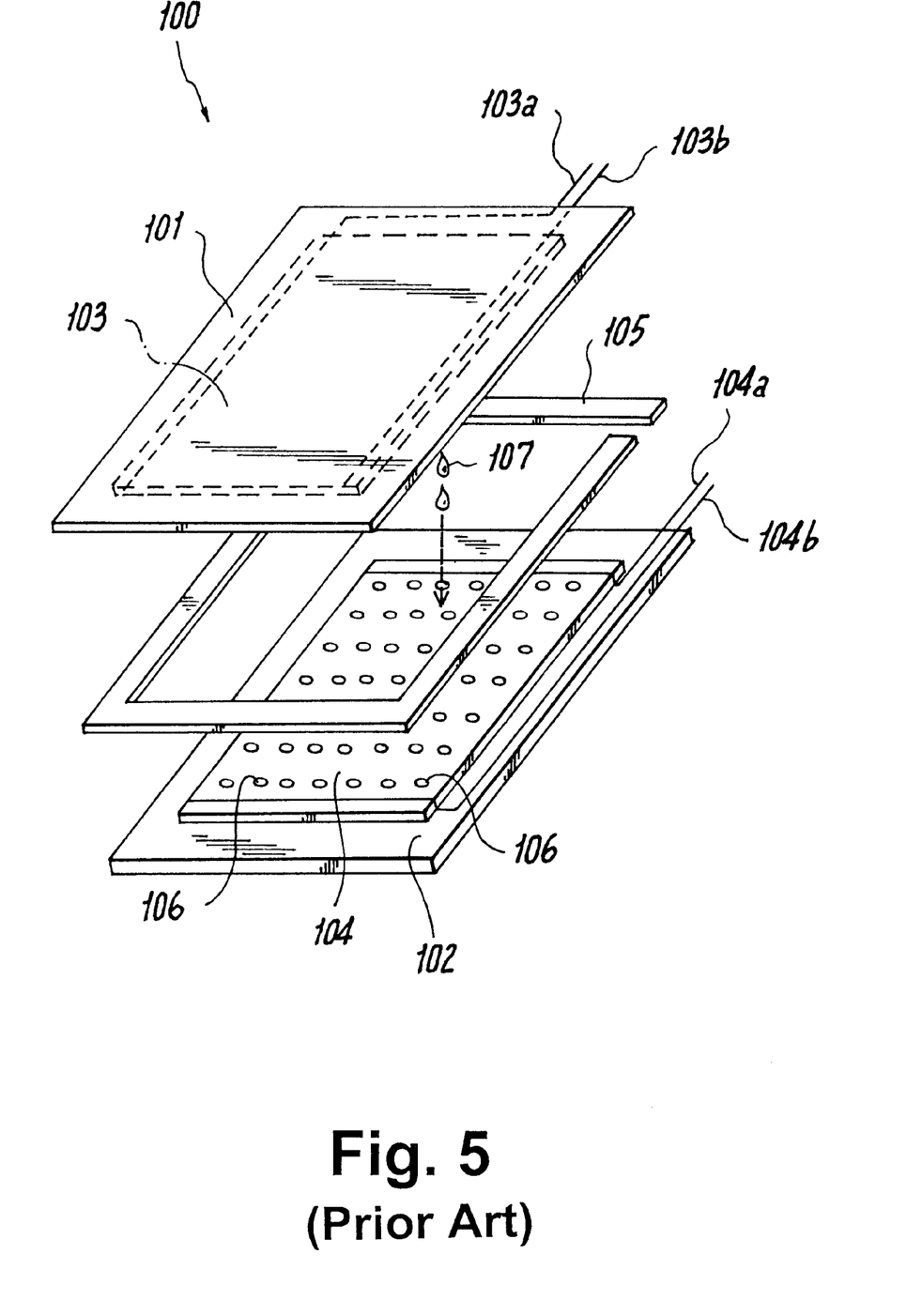
FIG. 5 is an exploded perspective drawing of a conventional touch panel input device 100.
Figure 6:
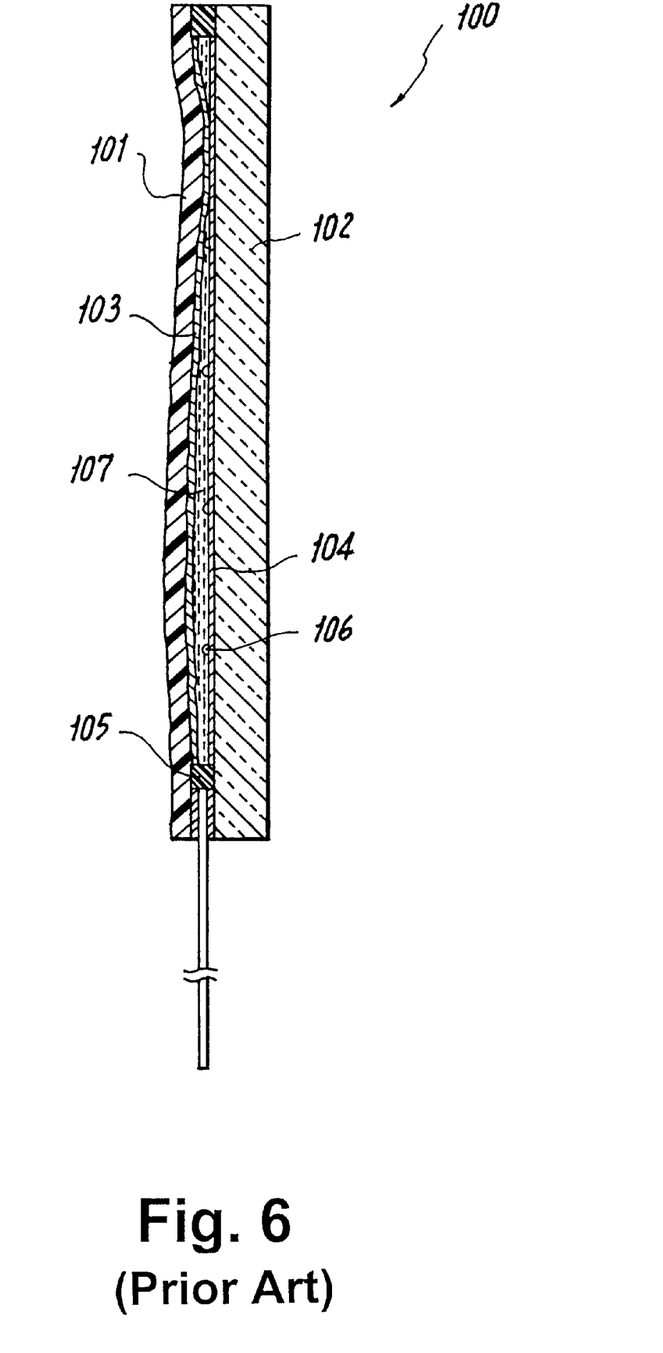
FIG. 6 is a vertical cross-sectional view of key parts of a conventional touch panel input device 100.

Referring to FIGS. 5 and 6, a conventional touch panel input device 100 consists of a movable thin transparent plate 101, and a thick transparent plate 102 that is mounted up against a display device (not shown.) The two transparent plates, 101 and 102 are laminated together with a slight gap using a frame-shaped spacer 105.

Both facing surfaces of the transparent plates 101 and 102, are coated with smooth transparent conductor layers 103 and 104, of uniform thickness consisting of an indium tin oxide (ITO) film or other suitable transparent conductors. Leads 103a, 103b, 104a, and 104b are electrically connected on both sides of smooth transparent conductor layers 103 and 104 respectively. The voltage is read at a contact position between smooth transparent conductor layers 103 and 104 and the voltage corresponds to the pressed position on the surface of movable thin transparent plate 101.

Smooth transparent conductor layers 103 and 104 are usually separated by a frame shaped spacer 105. Dot spacers 106 which are composed of an insulative composite resin such as epoxy resin, are also affixed to transparent conductor layer 104 at appropriate intervals to prevent accidental contact between smooth transparent conductor layers 103 and 104. Dot spacers 106 often prevent the pressed position from being detected if the radius of curvature of the pressing device, as is the case when using a finger, is large. This also prevents accidental input from being detected when a person holding a stylus accidentally touches the surface of touch panel input device 100. This is referred to as a slip-of-the-hand operation.

The top and bottom surfaces of frame shaped spacer 105 are glued by an adhesive to the perimeter of smooth transparent conductor layers 103 and 104, sealing in the space between smooth transparent conductor layers 103 and 104. A transparent insulative liquid 107 is injected into the space between smooth transparent conductor layers 103 and 104. The refractive index of the transparent insulative liquid 107 is closer to the refractive index of the smooth transparent conductor layers 103 and 104 than it is to the refractive index of air. Because the difference between the refractive indices of the transparent insulative liquid 107 and the smooth transparent conductive layers 103 and 104 is less than the difference between the refractive indices of air and the smooth transparent conductor layers 103 and 104, the amount of light transmitted through the touch panel input device 100 is improved.

This difficulty is addressed in, for example, Japanese unexamined patent application publication number S64-14630(1989) and Japanese unexamined patent application publication number H2-105916 (1990), which disclose a touch panel input device in which a transparent, insulative liquid that has a refractive index that is relatively close to that of the substrate and movable plate, is injected between them and sealed. Use of an insulative liquid with a comparable refractive index both lowers reflectivity and improves transinittivity.

When an insulative liquid such as silicon oil is used, transmittivity can be increased to about 90%. The underlying display screen is much easier to read because it appears brighter and has less glare.

Unfortunately, while improving transmittivity, the introduction of the insulative liquid leads to other problems, especially when the touch panel input device is operated in a tilted position. When the touch panel input device is operated in a generally vertical orientation, the insulative liquid between the two plates settles downward under its own weight. This produces a near vacuum in the upper section, allowing the facing surfaces of the transparent plate and the transparent substrate to approach each other within several microns. The close proximity of the two plates leads to false command data input being sent to the processor, even though the screen is not being pressed.

In addition to the above problem, when the screen is pressed, it is more difficult to bring the moveable transparent plate in contact with transparent substrate, because of the presence of the insulative liquid. The insulative liquid increases the pressing force required to operate the device. Devices that increase the pressure by applying the force over a smaller area, such as a stylus pen, can be used to overcome this problem, but this solution does not help when operating the touch panel with a finger, as is often desirable. Because the force is spread out over a greater area when using a finger, the pressure applied to the moveable transparent plate is decreased making it difficult to detect the pressed position. Because of this, operations such as writing text, drawing figures, or dragging the cursor on the display screen using only a finger is very difficult.

OBJECTS AND SUMMARY OF THE INVENTION

In view of the above discussion, it is an object of the present invention to overcome the drawbacks of the prior art.

It is a further object of the present invention to provide a touch panel input device that utilizes a light pressing force, without malfunctioning, even if the device as a whole is tilted and even if the input is done with a finger.

Briefly stated, the present invention provides a transparent insulative liquid sealed between two transparent plates that are coated with transparent conductor layers on their mutually facing surfaces of a touch panel input device. The facing surface of at least one of the transparent plates is roughened.

Because the conductor layer is applied directly over the roughened surface of the transparent plate, the conductor layer is also roughened. When the entire device is tilted, the insulative liquid settles downward allowing the upper conductor layers to come into contact with each other, but because the surface is roughened only the protrusions of the conductor layer make contact. The overall contact resistance does not decrease sufficiently to be interpreted as a pressing operation. When a pressing operation is made, the insulative liquid flows into the depressions created by the roughened surface of the conductor layer. Because the liquid is not interposed between conductor layers, sure contact is made, and the pressed position requires only a light pressing force.

According to an embodiment of the invention, there is provided a touch panel input device comprising: an outer transparent plate that has an outer transparent plate first surface and an outer transparent plate second surface; the outer transparent plate is flexible, an inner transparent plate having an inner transparent plate first surface and an inner transparent plate second surface; the outer transparent plate second surface and the inner transparent plate first surface face each other to form mutually facing surfaces; the outer transparent plate and the inner transparent plate where at least one of the mutually facing surfaces is a roughened surface; a first transparent conductive layer coating the outer transparent plate second surface; a second transparent conductive layer coating the inner transparent plate first surface; a flexible seal interposed between the mutually facing surfaces; a transparent insulative liquid; the transparent insulative liquid is interposed between the mutually facing surfaces, and a position detection means electrically connected to the first conductive layer of the outer transparent plate and the second conductive layer of the inner transparent plate to interpret a contact position when the first transparent conductor layer is pressed against the second transparent conductive layer.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 2:
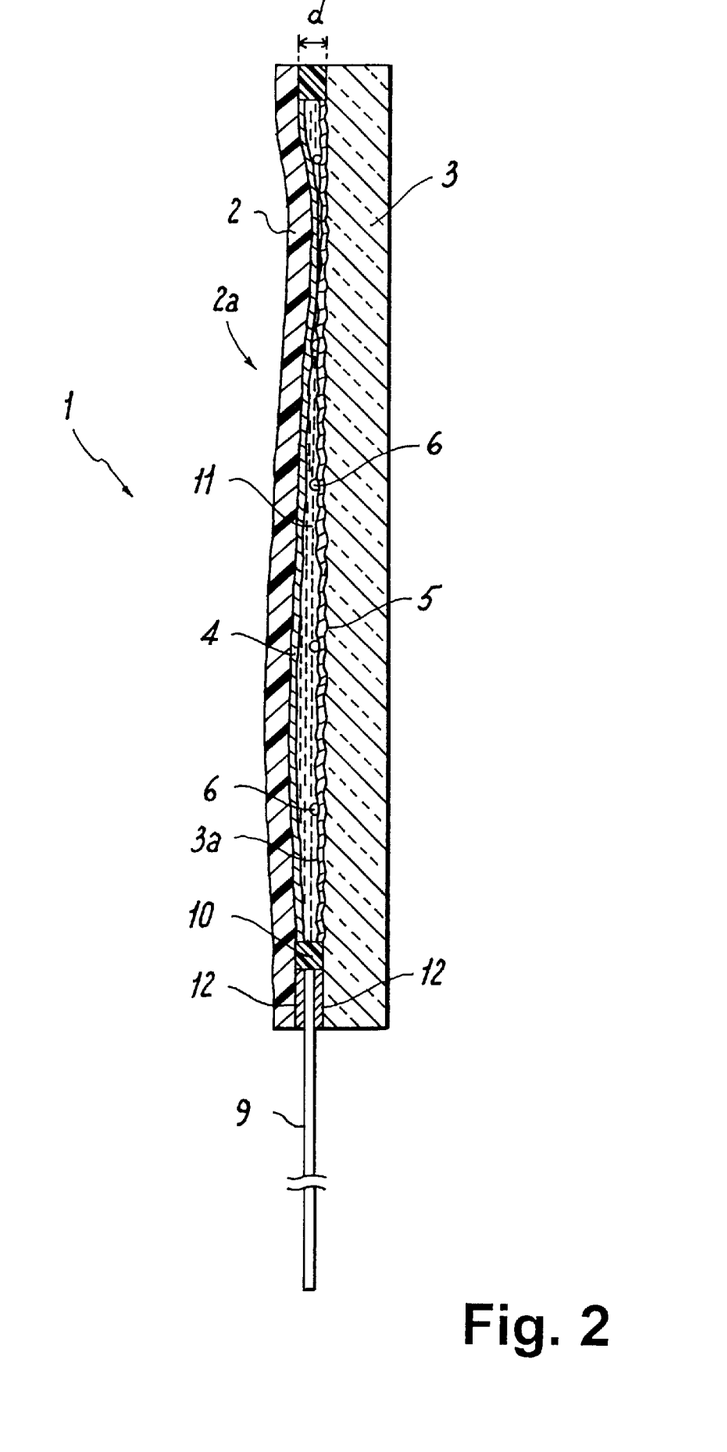
FIG. 2 is a vertical cross-sectional view of touch panel input device 1 tilted vertically.

Referring to FIG. 2, a touch panel input device shown generally as 1 includes a movable-side transparent plate 2, which functions as the outer transparent plate. It is formed of a flexible material using a transparent synthetic resin such as, polyethylene terephthalate (PET), however, it may be made of any flexible, transparent material, such as polycarbonate (PC), polyether sulfone (PES), polyimide (PI), or glass. The outer surface of movable-side transparent plate 2 is coated with a transparent hard coating (not shown) to protect the outer surface, which forms pressing operation surface 2a. The touch pane 1 input device 1 also includes a fixed-side transparent plate 3 which serves as the inner transparent plate. It is disposed parallel to movable-side transparent plate 2 by means of a flexible adhesive layer 10, which is described below. Movable conductor layer 4 and fixed conductor layer 5, cover the inside facing surfaces of moveable-side transparent plate 2 and fixed-side transparent plate 3, respectively. Movable conductor layer 4 and fixed conductor layer 5 are parallel to each other and separated by gap d. Gap d must be at least 5 microns wide in order to provide adequate insulation between the conductor layers, but less than 50 microns so that the volume of transparent insulative liquid 11 that is sealed between the plates is not larger than necessary. The preferred range for gap d is between 10 and 20 microns. The fixed-side transparent plate 3 may be made of the same material as movable-side transparent plate 2, but here it is made of soda-lime plate glass.

Figure 3:
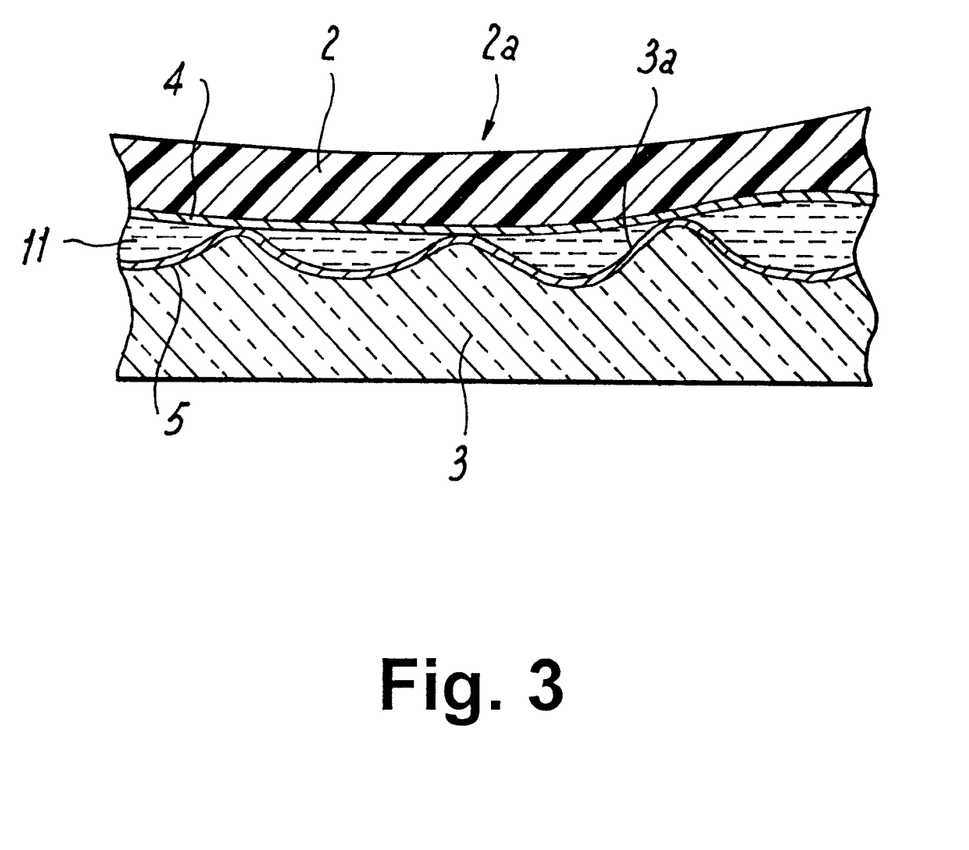
FIG. 3 is an enlarged view of key parts of FIG. 2.

Referring now to FIGS. 2 and 3, the entire outer surface of fixed-side transparent plate 3, or more specifically, the surface that faces movable-side transparent plate 2, is a roughened surface 3a. The difference in height between the high and low points of the roughened surface 3a is much smaller than gap d, the distance between movable conductor layer 4 and fixed conductor layer 5. If, for example, gap d is between 10 and 20 microns, then roughened surface 3a is formed so that its average height difference lies in the range 0.2 to 0.4 microns and its maximum height difference lies between 0.4 and 0.8 microns. In this embodiment, chemical processing by chemical etching is used to form the roughened surface 3a.

The roughened surface 3a is made by spraying hydrogen fluoride, or another appropriate agent, on the surface of the fixed-side transparent plate 3 to form depressions and protrusions. The roughness of the surface 3a is controlled by regulating the concentration of the dissolving solution, spraying time, pressure, and other parameters. It is relatively simple to form the required roughness of the surfaces using chemical etching, and even if the touch panel input device is mass produced, chemical etching produces consistent results with little variability in the size of the depressions and protrusions. Of course other methods for forming a roughened surface on fixed-side transparent plate 3 may be utilized and still be within the scope of the instant invention. Precision photographic techniques may be utilized where an etch-resistant coating is applied to the surface of the transparent plate 3.The transparent plate 3 is exposed to light through a mask or other device in such a way that some areas become resistant to the dissolving agent, while other areas remain unprotected. Treated transparent plate 3 is then exposed to an etching solution. The unprotected areas form the depressions while the protected areas form the projections producing the desired roughened surface. Abrasive methods may also be used to produce roughened surface such as sandblasting.

As described above, movable conductor layer 4 and fixed conductor layer 5,are transparent conductive films with a uniform film thickness of about 0.01 to 0.03 microns. Moveable conductor layer 4 is affixed to the inner surface of movable-side transparent plate 2. Fixed conductor layer 5 is affixed to roughened surface 3a of the inner surface of fixed-side transparent plate 3. In this way the two conductor surfaces face each other. Movable conductor layer 4 and fixed conductor layer 5 are both composed of indium tin oxide (ITO) and are made to have a uniform thickness. This uniformity gives the conductive layers the same resistance per unit length at every position on the conductor layer. Fixed-side transparent plate 3 is given an undercoating (not shown) of silicon dioxide ($SiO_2$) or the like between roughened surface 3a of fixed-side transparent plate 3 and fixed conductor layer 5. This prevents the alkaline components of the soda-lime glass of fixed-side transparent plate 3 from being dissolved away by the transparent insulative liquid 11.

Referring again to FIG. 2, dot spacers 6, which are composed of an insulative synthetic resin, are affixed on fixed conductor layer 5. In a touch panel input device 1 of this type, dot spacers 6 are generally spaced 0.5 to 3 mm apart. In this embodiment the dot spacers 6 are spaced 21 mm apart and are 10 microns high, which is less than the width of the gap d. These dot spacers 6 prevent incorrect input due to the so called slip-of-the-hand operation.

Figure 1:
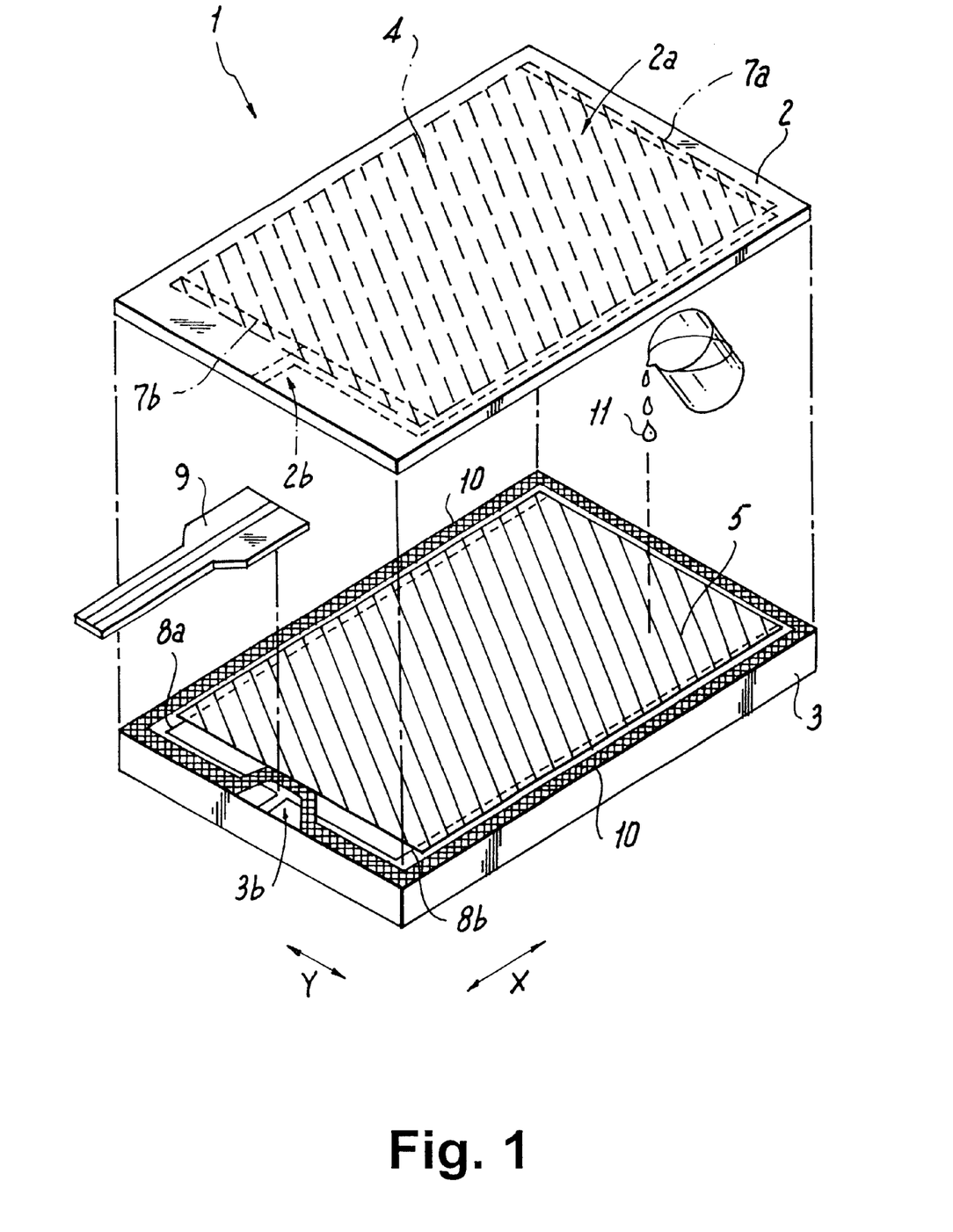
FIG. 1 is an exploded perspective drawing of touch panel input device 1 in which is sealed transparent insulative liquid 11.

Referring to FIG. 1, movable-side transparent plate 2, has an x potential-side lead 7a and an x grounding-side lead 7b, which are electrically connected to movable conductor layer 4. Leads 7a and 7b are printed on opposite ends of movable conductor layer 4 and are parallel to the y-axis. The x potential-side lead 7a and the x grounding-side lead 7b are made of a transparent conductor such as silver paste. X potential-side lead 7a extends and makes electrical connection with x-axis external connector 2b. X grounding-side lead also extends to and makes connection with x-axis external connector 2b. The x-axis external connector 2b provides communication with an external circuit (not shown).

Similarly, on the inner surface of fixed-side transparent plate 3, y potential-side lead 8a and y grounding-side lead 8b are electrically connected to fixed conductor layer 5. Leads 8a and 8b are printed on opposite ends of fixed conductor layer 5 and are parallel to the x-axis. Y potential-side lead 8a and y grounding-side lead 8b are also made of a transparent conductor such as silver paste. Y potential-side lead 8a extends and makes electrical connection with y-axis external connector 3b. Y grounding-side lead also extends to and makes connection with y-axis external connector 3b. The y-axis external connector 3b provides communication with an external circuit (not shown). X-axis external connector 2b and y-axis external connector 3b face each other to provide connection with an external circuit (not shown.) Referring now to FIGS. 1 and 2, leads 7a, 7b, 8a, 8b are connected to external connectors 2b and 3b respectively. External connectors 2b and 3b are connected by conductive adhesive 12 to printed patterns corresponding to the upper and lower surfaces of flexible substrate 9. Flexible substrate 9 is electrically connected to the pressed position detection circuit unit 20 of FIG. 4.

Referring to FIG. 1, movable-side transparent plate 2 and fixed-side transparent plate 3 are fixed to each other by a flexible adhesive. The adhesive can be any suitable flexible adhesive, but in this embodiment an elastic ultraviolet-cured pressure-sensitive adhesive which is suitable for screen printing such as, Acheson Corporation product number ML-25251,is used. The flexible adhesive is disposed around the perimeter of conductor layers 4 and 5.The gap d between conductor layers 4 and 5,can be adjusted to the desired value by varying the thickness of the flexible adhesive applied to the conductor layers 4 and 5.The flexible adhesive is applied so as to surround fixed conductor layer 5 while avoiding the position where external connector 3b is connected to flexible substrate 9. Once applied, the flexible adhesive is exposed to ultraviolet rays, hardening the bonds between molecules in a few seconds and transforming it into flexible adhesive layer 10.

Referring again to FIG. 2, the facing surfaces of movable-side transparent plate 2 and fixed-side transparent plate 3 are pressed together with 5 the flexible adhesive layer 10 between them. Because the adhesive is pressure-sensitive, the facing surfaces of movable-side transparent plate 2 and fixed-side transparent plate 3 adhere to the flexible adhesive layer 10. This aligns movable conductor layer 4 and fixed conductor layer 5 parallel to each other with intervening gap d. Because the ultraviolet-cured pressure-sensitive adhesive has elasticity after it is cured, movable-side transparent plate 2 is able to move horizontally (parallel to the X-Y plane) with respect to adhesive layer 10 and fixed-side transparent plate 3. Therefore even if pressing operation surface 2a is pressed near adhesive layer 10, movable-side transparent plate 2 can still move inward. This allows movable conductor layer 4 to make sure contact with fixed conductor layer 5 at the pressed position.

In the bonding process of movable-side transparent plate 2 and fixed-side transparent plate 3, transparent insulative liquid 11 is injected into the space between them. Flexible adhesive layer 10 forms a border around gap d that is formed between movable conductor layer 4 and fixed conductor layer 5. When the bonding is done, the space is completely cut off from the outside, and transparent insulative liquid 11 is injected into this space and sealed in. Care must be taken during this step to ensure that there are no leaks to the outside. Also, it is very important that the pressure-sensitive adhesive that comprises flexible adhesive layer 10 is a bonding agent with a 100% solid content containing no solvents. This is to ensure that even if the insulative liquid 11 comes into contact with the flexible adhesive layer 10, there is no risk that insulative liquid 11 will be contaminated by solvents from the flexible adhesive layer 10, thereby damaging the insulative liquid 11.

Various liquids can be used for transparent insulative liquid 11 as long as they are transparent. Some acceptable liquids include fresh water, paraffin-based oils, petroleum-based oils, vegetable oil, and silicon oil. In this embodiment, silicon oil having a viscosity of 5–20 cp is used to ensure that movable-side transparent plate 2 and fixed-side transparent plate 3 quickly assume their original position once the pressure on them is released. The refractive index of silicon oil (1.4) is closer to the refractive index of ITO (1.9), the material of conductor layers 4 and 5, than it is to the refractive index of air (1.0.) Because of the smaller difference in the refractive indices of the silicon oil and ITO, the overall amount of light transmitted through the touch panel input device 1 is 90% or greater.

The entire facing surface of the fixed-side transparent plate 3 is a roughened surface 3a, but the incident light merely scatters, with no effect on the transmittivity of the light.

Gap d, the space between movable conductor layer 4 and fixed conductor layer 5 is narrow; between 5–20 microns. Because gap d is so narrow, the surface tension of the sealed-in insulative liquid 11 causes the liquid to adhere fairly evenly to the conductive layers 4 and 5, but when the touch panel input device 1 is tilted, as stated above, the insulative liquid 11 settles downward by its own weight, causing the pressure in the upper section to fall to a near-vacuum state. Under the influence of the near vacuum produced in the upper section, the facing surfaces of movable-side transparent plate 2 and fixed-side transparent plate 3 approach each other. Because the underlying facing surface of fixed-side transparent plate 3 is a roughened surface 3a, the surface of fixed conductor layer 5 which is formed directly over the roughened surface 3a and is only 0.01–0.03 microns thick, is likewise is a roughened surface. Therefore, even where the conductive layers 4 and 5 approach each other, only the protrusions of fixed conductor layer 5 come into contact with movable conductor layer 4. Because only the protrusions make contact, the overall resistance between fixed conductor layer 5 and movable conductor layer 4 is not greatly decreased. This eliminates the danger that a signal will be sent to the processing unit as if the touch panel input device 1 is being pressed.

Additionally, when a pressing operation is made, unlike the prior art in which contact is made between smooth conductor layers 103 and 104 of FIGS. 5 and 6, only the protrusions make contact in the present invention. Although this reduces the contact area, the contact pressure becomes correspondingly larger because the same amount of force is applied over the smaller contact areas of the protrusions. Since the pressure is proportionately greater than in the prior art, the overall contact resistance when the touch panel input device 1 is pressed, is relatively the same as in the prior art. This ensures that a signal will be produced and sent to the processor even though the contact area is reduced.

Moreover, in touch panel input device 1 of this embodiment, because insulative liquid 11 escapes into the depressions in fixed conductor layer 5 and is not interposed between fixed conductor layer 5 and movable conductor layer 4, good contact can be made with a lighter pressing force than in the prior art. Because less force is required to make a good contact when the touch panel input device 1 is pressed, a finger can be used as the input device rather than relying on a stylus or other means of increasing the pressure.

Figure 4:
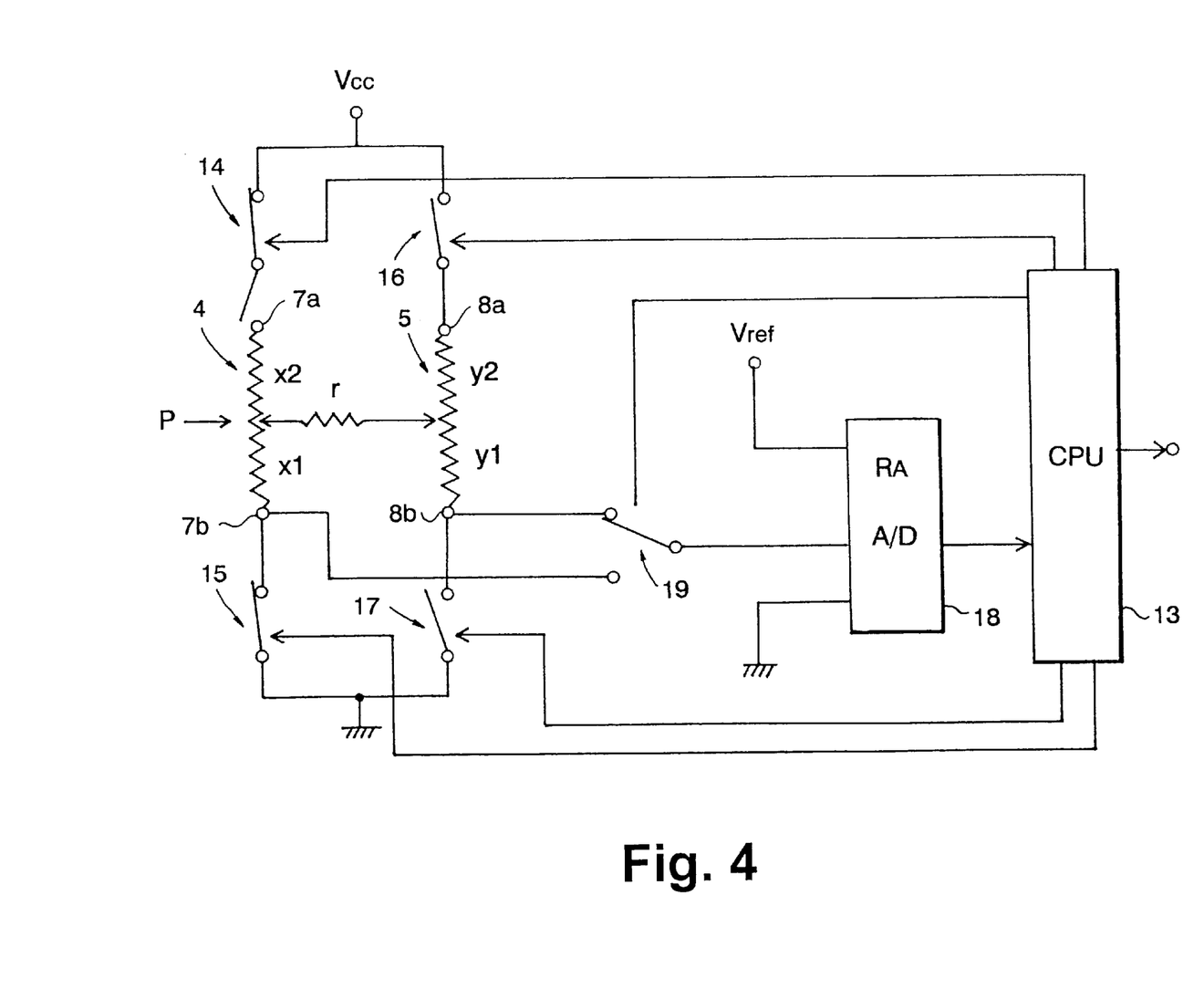
FIG. 4 is a circuit diagram for detecting the pressed position.

Referring to FIGS. 2 and 4, the touch panel input device 1 is attached over a liquid crystal display screen (not shown.) When the touch panel input device 1 is pressed, the pressed position is detected by pressed position detection circuit 20. The pressing operation surface 2a is pressed with a pen, finger, or the like, causing contact to be made between the movable conductor layer 4 and fixed conductor layer 5. This contact is interpreted as command input data that corresponds to the content of the command displayed below the pressed position and is sent to a personal computer (not shown).

Movable conductor layer 4 and fixed conductor layer 5 are both formed to have uniform resistance. A coordinate detection voltage is applied to potential-side leads 7a and 8a of conductor layers 4 and 5. Grounding-side leads 7b and 8b are grounded. This sets up potential gradients having equal slopes, and a potential is generated at each position of conductor layers 4 and 5 that is proportional to the distance from the leads. To detect the pressed position, first, the x-coordinate detection mode is enabled. Next, under the control of the CPU 13, x-side switches 14 and 15 are closed and a potential gradient is applied to movable conductor layer 4, while y-side switches 16 and 17 are opened. At the same time, switch 19, which is connected to the input terminal of the A/D converter 18, is connected to the y grounding-side lead 8b side of fixed conductor layer 5. When point P ($P_x$, $P_y$) of pressing operation surface 2a is pressed with a stylus pen or the like, movable conductor layer 4 makes contact with fixed conductor layer 5. Potential $V_{Px}$ at point P on movable conductor layer 4 is given by:

$$V_{px} = V_{cc} * \frac{x_1}{(x_1 + x_2)}$$

where:

$x_1$ is the resistance of the distance from x grounding-side lead 7b; and $x_2$ is the resistance of the distance from x potential-side lead 7a.

The x-coordinate $P_x$ is detected by reading potential $V_{px}$ with A/D converter 18.

Next, the y-coordinate detection mode is enabled. X-side switches 14 and 15 are opened, and y-side switches 16 and 17 are closed. Switch 19, which is connected to the input terminal of A/D converter 18, is connected to x grounding-side lead 7b of movable conductor layer 4. Potential $V_{py}$ at point P on fixed conductor layer 5 is similarly given by:

$$V_{py} = V_{cc} * \frac{y_1}{(y_1 + y_2)}$$

where:

$y_1$ is the resistance of the distance from y grounding-side lead 8b, and $y_2$ is the resistance of the distance from y potential-side lead 8a.

The y-coordinate $P_y$ is detected by reading potential $V_{Py}$ with A/D converter 18. Both detection operations are cyclically repeated allowing the pressed position to be detected in both the x and y directions.

The above embodiment is described with a so-called analog type touch panel input device in which movable conductor layer 4 and fixed conductor layer 5 are uniformly affixed to the facing surfaces of inner and outer transparent plates 2 and 3. Another embodiment within the scope of this invention is the so-called digital type touch panel input device in which movable conductor layer 4 and fixed conductor layer 5 are each split into many strip-shaped movable and fixed contact pieces. The contact pieces are attached mutually perpendicularly to the facing surfaces of movable-side transparent plate 2 and fixed-side transparent plate 3. This forms a matrix of contact positions. In a digital type touch panel input device, the pressed contact position is detected when a movable contact piece is pressed and makes contact with a fixed contact piece.

Although in the above embodiment, only the facing surface of fixed-side transparent plate 3 is a roughened surface 3a, either facing surface may be made into a roughened surface. The facing surface of the movable-side transparent plate 4 could be made to be a roughened surface or both surfaces could be roughened.

Additionally, the processing method for making a facing surface into a roughened surface is not limited to the above examples. Other methods might include forming depressions and protrusions on the inside surface of the mold that forms transparent plates 2 and 3 which would form a roughened surface when molded.

The height difference of the roughened surface and the gap are not limited to the above numerical examples. The actual height differences can be determined by taking into account such factors as the gap d between the conductor layers 4 and 5, and the elasticity and thickness of the transparent plates 2 and 3. Also, the present invention does not require dot spacers to prevent accidental contact.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A touch panel input device, comprising;
   an outer transparent plate;
   said outer transparent plate having a first surface and a second surface;
   an inner transparent plate;
   said inner transparent plate having a third surface and a fourth surface;
   said second surface and said third surface facing each other across a gap;
   at least one of said second and third surfaces having a roughened surface;
   a first transparent conductive layer coating said second surface;
   a second transparent conductive layer coating said third surface;
   a transparent insulative liquid substantially filling said gap;
   a flexible seal interposed between perimeters of said second and third surfaces to seal said gap;
   a position detection means electrically connected to said first conductive layer of said outer transparent plate and said second conductive layer of said inner transparent plate to interpret a contact position when said first transparent conductor layer is pressed sufficiently against said second transparent conductive layer; and
   said transparent insulative liquid is silicon oil having a viscosity of between 5–20 cp.

2. A touch panel input device comprising:
   an outer transparent plate;
   said outer transparent plate having a first surface and a second surface;
   an inner transparent plate;
   said inner transparent plate having a third surface and a fourth surface;
   said second surface and said third surface facing each other across a gap;
   at least one of said second and third surfaces having a roughened surface;
   a first transparent conductive layer coating said second surface;
   a second transparent conductive layer coating said third surface;
   a transparent insulative liquid substantially filling said gap;
   a flexible seal interposed between perimeters of said second and third surfaces to seal said gap;
   a position detection means electrically connected to said first conductive layer of said outer transparent plate and said second conductive layer of said inner transparent plate to interpret a contact position when said first transparent conductor layer is pressed sufficiently against said second transparent conductive layer; and
   said roughened surface has a roughness in the range of from about 0.2 to about 0.4 microns.

3. A process for making a touch panel device comprising:
   roughening a first surface of a first transparent plate;
   coating said first surface with a first transparent conductive layer;
   coating a second surface of a second transparent plate with a second transparent conductive layer;
   assembling said first and second transparent plates with said first and second surfaces facing each other separated by a gap;
   filling said gap with an insulative liquid;
   sealing perimeters of said of first and second transparent plates to each other to seal said gap; and
   inserting a position detection means electrically connected to said first conductive layer of said outer transparent plate and said second conductive layer of said inner transparent plate to interpret a contact position when said first transparent conductor layer is pressed sufficiently against said second transparent conductive layer, wherein the step of roughening includes roughening to a roughness of from about 0.2 to about 0.4 microns.

4. A process according to claim 3 wherein the step of roughening includes photoetching to produce said roughness.

5. A process for making a touch panel device comprising:
   roughening a first surface of a first transparent plate;
   coating said first surface with a first transparent conductive layer;
   coating a second surface of a second transparent plate with a second transparent conductive layer;
   assembling said first and second transparent plates with said first and second surfaces facing each other separated by a gap;
   filling said gap with an insulative liquid;
   sealing perimeters of said of first and second transparent plates to each other to seal said gap; and
   inserting a position detection means electrically connected to said first conductive layer of said outer transparent plate and said second conductive layer of said inner transparent plate to interpret a contact position when said first transparent conductor layer is pressed sufficiently against said second transparent conductive layer, wherein the step of roughening includes abrasion roughening.

6. A process according to claim 5, wherein said abrasion roughening includes sand blasting.

7. A process for making a touch panel device comprising:
   roughening a first surface of a first transparent plate;
   coating said first surface with a first transparent conductive layer;
   coating a second surface of a second transparent plate with a second transparent conductive layer;
   assembling said first and second transparent plates with said first and second surfaces facing each other separated by a gap;
   filling said gap with an insulative liquid;
   sealing perimeters of said of first and second transparent plates to each other to seal said gap; and
   inserting a position detection means electrically connected to said first conductive layer of said outer transparent plate and said second conductive layer of said inner transparent plate to interpret a contact position when said first transparent conductor layer is pressed sufficiently against said second transparent conductive layer, wherein the step of roughening includes chemical roughening.

8. A process according to claim 7, wherein the step of roughening includes molding.

9. A touch panel input device that utilizes a light pressing force without malfunctioning even when the device as a whole is tilted, said device comprising: an outer transparent plate;
   said outer transparent plate having a first surface and a second surface;

an inner transparent plate;

said inner transparent plate having a third surface and a fourth surface;

said second surface and said third surface facing each other across a gap;

at least one of said second and third surfaces having a roughened surface, said roughened surface having protrusions;

a first transparent conductive layer coating said second surface;

a second transparent conductive layer coating said third surface;

a transparent insulative liquid substantially filling said gap;

a flexible seal interposed between perimeters of said second and third surfaces to seal said gap;

a position detection means electrically connected to said first conductive layer of said outer transparent plate and said second conductive layer of said inner transparent plate to interpret a contact position when said first transparent conductor layer is pressed sufficiently against said second transparent conductive layer, said device when tilted causing the protrusions to establish a light contact engagement that is not a pressing operation.

10. A touch panel input device according to claim 9 wherein;

at least one of said outer transparent plate and said inner transparent plate is glass.

11. A touch panel input device according to claim 9 wherein;

said flexible seal is adhered to said second surface and said third surface.

12. A touch panel input device according to claim 9 wherein;

said outer transparent plate is flexible.

13. A touch panel input device according to claim 9 wherein;

said flexible seal is an ultraviolet-cured pressure sensitive adhesive.

* * * * *